US012749058B2

(12) United States Patent
Mandal et al.

(10) Patent No.: US 12,749,058 B2
(45) Date of Patent: Sep. 29, 2026

(54) BLOCKCHAIN-BASED ESCROWED MARKETPLACE

(71) Applicant: Fujitsu Limited, Kawasaki (JP)

(72) Inventors: Avradip Mandal, Kirkwood, CA (US); Yasushi Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 80 days.

(21) Appl. No.: 18/393,450

(22) Filed: Dec. 21, 2023

(65) Prior Publication Data

US 2025/0209433 A1 Jun. 26, 2025

(51) Int. Cl.
*G06Q 20/12* (2012.01)
*H04L 9/32* (2006.01)

(52) U.S. Cl.
CPC ......... *G06Q 20/123* (2013.01); *H04L 9/3218* (2013.01); *H04L 9/3236* (2013.01); *G06Q 2220/00* (2013.01)

(58) Field of Classification Search
CPC .............. G06Q 20/123; G06Q 2220/00; H04L 9/3218; H04L 9/3236
USPC .............................................................. 705/51
See application file for complete search history.

(56) References Cited

U.S. PATENT DOCUMENTS

2019/0229919 A1* 7/2019 Gurkan ................. H04L 9/0869
2020/0058023 A1* 2/2020 Travizano ............. H04L 9/3239
2020/0175601 A1* 6/2020 Letourneau .......... G06Q 20/223
2023/0045867 A1 2/2023 Mandal et al.
2023/0049512 A1 2/2023 Mandal et al.
2023/0104103 A1 4/2023 Eby et al.
2023/0274283 A1* 8/2023 Kryvoshei ........... G06Q 20/389
2023/0298001 A1* 9/2023 Jethmalani ........... G06Q 20/065 705/65
2024/0223371 A1* 7/2024 Narayanan ......... G06Q 30/0601

OTHER PUBLICATIONS

EU Office Action dated Dec. 2, 2024 in application 24195357.9.

* cited by examiner

*Primary Examiner* — Courtney P Jones
(74) *Attorney, Agent, or Firm* — Maschoff Brennan

(57) ABSTRACT

A method may include obtaining, from a first entity, and publishing a predicate, a first purchase price, and a first public key associated with the first entity. The method may also include obtaining, from a second entity, an encryption of a token satisfying the predicate and one or more knowledge-proving credentials. The method may additionally include verifying ownership of the token based on the credentials. The method may also include obtaining, from the first entity, assets corresponding to the first purchase price. The method may also include sending a portion of the knowledge-proving credentials, including at least an updated hash value, to a token blockchain. The method may additionally include verifying the updated hash value is posted to the token blockchain. The method may also include providing the encryption of the token to the first entity and transferring the assets corresponding to the first purchase price to the second entity.

20 Claims, 5 Drawing Sheets

BLOCKCHAIN-BASED ESCROWED MARKETPLACE

FIELD

Embodiments of the present disclosure relate to a blockchain-based escrow marketplace, and in particular, using such a marketplace to facilitate a transaction between entities.

BACKGROUND

Using an intermediary in a transaction provides added security. For example, the intermediary may hold and verify the properties being traded. However, using the intermediary often involves providing the intermediary temporary titles to the properties or other assets, which may involve revealing various details of the transaction to the intermediary.

SUMMARY

One or more embodiments of the present disclosure may include a method that includes obtaining, from a first entity, a predicate, a first purchase price, and a first public key associated with the first entity. The method may also include publishing the predicate, the first purchase price, and the first public key. The method may additionally include obtaining, from a second entity, an encryption of a token and one or more knowledge-proving credentials of the token, where the token satisfies the predicate. The encryption of the token may be encrypted using the first public key. The method may also include verifying ownership of the token based on the knowledge-proving credentials. The method may also include obtaining, from the first entity, an asset corresponding to the first purchase price. The method may additionally include sending at least a portion of the knowledge-proving credentials including an updated hash value, where the updated hash value represents ownership of the token being transferred from the second entity to the first entity. The method may additionally include verifying that the updated hash value is posted to the token blockchain. The method may additionally include providing the encryption of the token to the first entity, and transferring the asset corresponding to the first purchase price to the second entity.

The object and advantages of the embodiments will be realized and achieved at least by the elements, features, and combinations particularly pointed out in the claims.

It is to be understood that both the foregoing general description and the following detailed description are merely examples and explanatory and are not restrictive.

BRIEF DESCRIPTION OF THE DRAWINGS

Example embodiments will be described and explained with additional specificity and detail through the use of the accompanying drawings in which.

DETAILED DESCRIPTION

Figure 1:
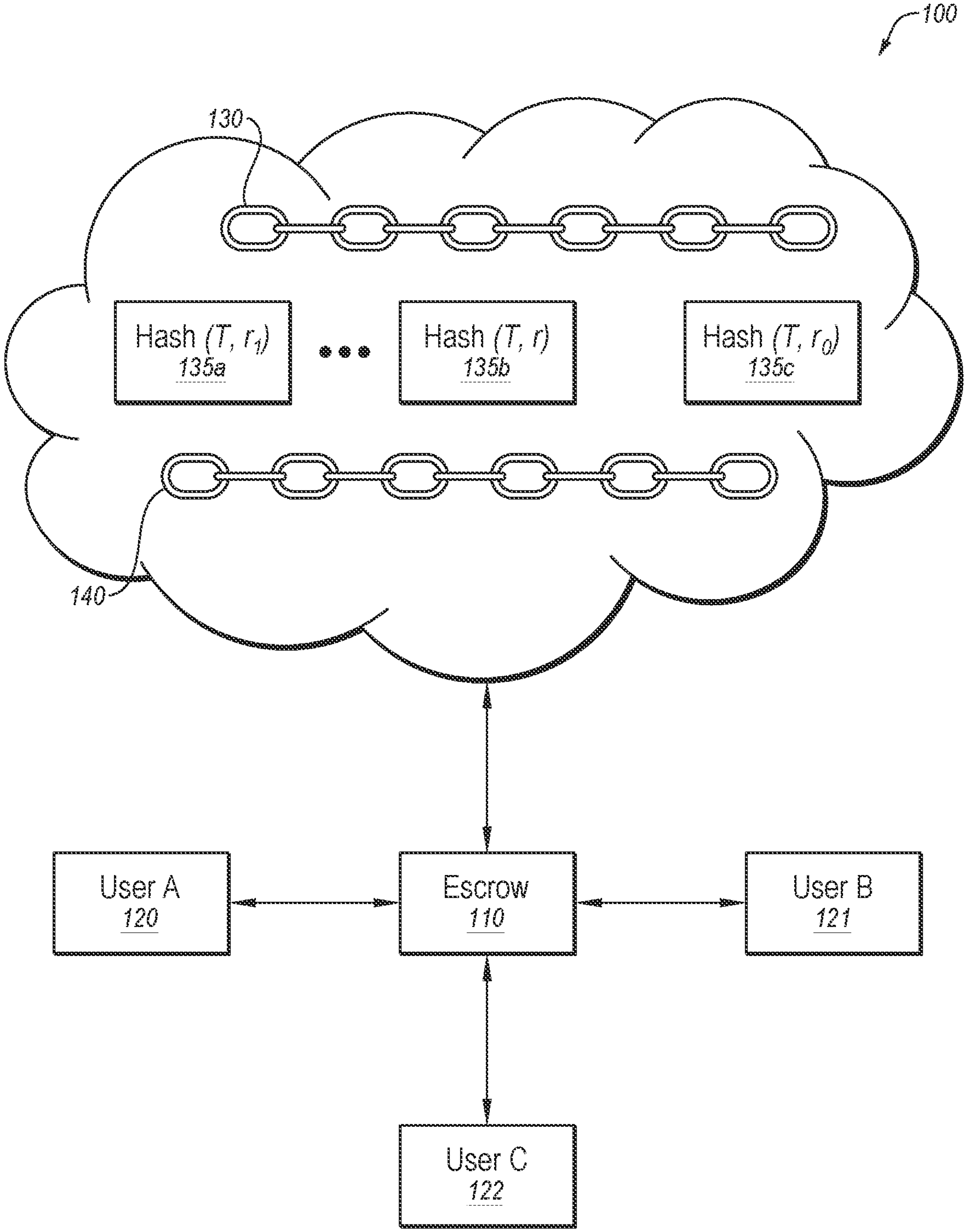
FIG. 1 is a diagram illustrating an example system which may operate as a blockchain-based escrow marketplace.

The present disclosure relates to the use of an escrow to securely transfer a token between users. For example, the escrow may provide a marketplace for a buyer to place an offer for a particular token that may be associated with or otherwise identify ownership of a given asset that the buyer wants to purchase. For example, the asset may be real estate and the token may signify ownership of that real estate and/or rights associated with ownership of that real estate. A seller may locate the offer on the marketplace and initiate a transaction through the escrow. For example, the seller may hold the token associated with ownership of the desired real estate. The escrow may act as an intermediary to ensure that both the seller and the buyer perform the requirements of the transaction. For example, the escrow may verify that the seller is the current owner of the token. As another example, the escrow may receive and verify the payment the buyer is providing in exchange for ownership of the token. During the transaction, the escrow may temporarily hold the payment until the escrow is able to verify that the ownership of the token is transferred to the buyer. The transfer of the token from the seller to the buyer may be verified by a new block being posted to the blockchain updating the ownership information of the token. After validating the new block is on the blockchain (e.g., that ownership has changed), the escrow may transfer the payment to the seller.

In these and other embodiments, contents of the token being transferred may remain secret to the escrow throughout the process. For example, a predicate related to the token may be used by the buyer to identify the token without revealing the contents of the token to the escrow. Additionally or alternatively, the seller may prove ownership of the token without revealing the contents of the token. For example, one or more non-interactive zero knowledge proofs (NIZKP) generated by the seller may be used to prove ownership of the token to the escrow. Additionally or alternatively, a similar or comparable NIZKP may be used by the seller to prove ownership of the asset associated with the token to the escrow.

In some embodiments, the contents of the token may be hidden from the escrow even when transferring the token from the escrow to the buyer. For example, an encrypted version of the token may be used in the exchange. For example, the seller may encrypt the token using a public key associated with the buyer. The buyer may be the only one able to decrypt the encrypted token using their private key associated with the public key. In these and other embodiments, the identity of the buyer and the seller may remain anonymous to each other. For example, the buyer and the seller may use freshly generated keys in every transaction to keep their identities hidden. For instance, the buyer may generate a fresh public key for each transaction to be published to the marketplace.

The use of such embodiments may provide an improvement to the operation of a computing system and to the related technology of blockchains. For example, embodiments of the present disclosure may provide a more protected interaction between parties by providing an escrow as an intermediary. In particular, the parties may perform transactions anonymously to each other. For example, the parties do not need to know who they are transacting with, nor do they need to transact at the same time as each other. For example, the parties do not perform any direct transactions with each other and the transactions with the escrow may be performed at different times. In some embodiments, the users and/or tokens across transactions may be unlinkable (e.g., particular users may or may not be traceable to certain transactions and/or tokens). Additionally, the escrow initiates and verifies, with a token blockchain, the ownership transfer of the token between the parties. This may protect the parties from possible fraudulent misrepresentations about the ownerships. Additionally, embodiments of the present disclosure permit a secure transaction between the parties by permitting limited exposure of information. In particular, the contents of the token may remain hidden from the escrow throughout the transaction process. For example, the escrow may be able to verify ownership of a token in a reliable manner while the escrow does not have access to the actual contents of the token. Additionally, the escrow may verify that the token is the correct token for the transaction based on token identifiers that do not reveal the contents of the token. This may protect the privacy of the transaction while also reducing the workload of the escrow.

One or more example embodiments are explained with reference to the accompanying drawings.

FIG. 1 is a diagram illustrating an example system 100 which may utilize an escrow 110 as an intermediary facilitating a transaction between users. The system 100 may include a user A 120, a user B 121, a user C 122, a first blockchain 130, and a second blockchain 140. In some embodiments, the first blockchain 130 may include successive blockchain entries, including a first blockchain entry 135*a*, a second blockchain entry 135*b*, and a third blockchain entry 135*c*.

The escrow 110 may include a third party or a trusted entity acting as an intermediary between users. For example, the escrow 110 may permit the transfer and/or verification of information, assets, tokens, or other aspects of a transaction without a direct transfer of information, assets, tokens, or other aspects of the transaction between the parties of the transaction. For example, the escrow 110 may allow the users A and B 120/121 to transfer and receive tokens and assets while the users A and B 120/121 stay anonymous.

In operation, the escrow 110 may be configured to facilitate a transaction between the user A 120 and the user B 121. For example, the user A 120 may be a buyer, purchasing from the user B 121, a seller. The transaction may be made through the escrow 110, where the escrow 110 may be an intermediary and a verifier of the transaction. In these and other embodiments, the user A120 and the user B 121 do not necessarily need to interact with each other as they are able to interface with the escrow 110.

In some embodiments, the escrow 110 may post its escrow public key ($pk_e$) to be available to users. A user desiring to purchase an asset may send asset information to the escrow. For example, the user A 120 may desire to purchase a token (T). The escrow 110 may obtain information from the user A 120 regarding their interest in the token (T). For example, the user A 120 may send to the escrow 110 a token requirement predicate ($P_i$), a first purchase price ($s_i$), and a first public key ($pk_i$) associated with the user A 120. The token requirement predicate ($P_i$) may contain requirement of the token (T). For example, the token requirement predicate ($P_i$) may include identifiers or other properties of the token (T) such that an owner or holder of the token (T) may identify the token (T) based on the token requirement predicate ($P_i$). For example, stated mathematically, $P_i$(T) may resolve as true, indicating that the token (T) satisfies the token requirement predicate ($P_i$). The purchase price ($s_i$) may identify an amount of a given asset the user A 120 is willing to pay for the token (T). For example, the purchase price ($s_i$) may specify an amount of a type of cryptocurrency that the user is offering for the token (T). The first public key ($pk_i$) may allow information to be encrypted in a manner that only the holder of the corresponding secret key ($sk_i$) (e.g., the user A 120) is able to decrypt the information. The escrow 110 may publish or otherwise make available to the public a tuple ($P_i$, $s_i$, $pk_i$) including the information from the user A 120 indicative of their interest in the token (T).

In some embodiments, the escrow 110 may publish the tuple ($P_i$, $s_i$, $pk_i$) in such a way that it does not identify the user A 120. For example, the token requirement predicate, the purchase price, and/or the public key may all include information that is devoid of identifying information that ties the user A 120 to the information in the tuple. In these and other embodiments, the escrow 110 may maintain a database or other data store that correlates the information from the tuple with the user A 120.

In some embodiments, the user B 121 may locate the information published by the escrow 110. The user B 121 may analyze the information and determine that the user B 121 has the token (T) for which the user A 110 is looking. For example, state mathematically, $P_i$(T) may resolve as true for the token (T) held by the user B 121. In some instances, if $P_i(T_f)$ resolves as false, such a resolution may indicate that the token ($T_f$) held by the user B 121 is not the token for which the user A 120 is looking.

In some embodiments, the user B 121 may determine that the first purchase price ($s_i$) as identified in the tuple satisfies a minimum price for which the user B 121 is willing to sell the token (T). The user B 121 may determine that the first purchase price ($s_i$) in the marketplace is acceptable for the token (T). The user B 121 may desire to sell the token (T) to the user A 120 and initiate a transaction with the escrow 110 to sell the token (T) to the user A 120 for the purchase price ($s_i$).

In some embodiments, to facilitate the transfer of the token (T) to the user A 120, the user B 121 may generate various pieces of information to show and implement the transfer of ownership. For example, the user B 121 may generate one or more knowledge-proving credentials and an encryption of the token (T) and may provide that information to the escrow 110. The escrow 110 may verify the current ownership of the token (T) based on the one or more knowledge-proving credentials.

In some embodiments, the knowledge-proving credentials may include $h_\ell$ where $h_\ell$ may correspond to the last or most recently posted hash value on the first blockchain 130. The last hash value may be representative of a current owner of the token (T). The user B 121 may recall an initial randomness value (r) from storage where (r) may correspond to the latest randomness value on the first blockchain 130, where (T) and (r) may satisfy $h_\ell$=Hash(T||r) where Hash may represent a hashing function and where || may represent a concatenation of two elements (such as the concatenation of (T) and (r)). In some embodiments, the knowledge-proving credentials may further include a first proof of knowledge ($\pi_p$) indicating knowledge of (T) and (r). For example, a non-interactive zero-knowledge proof (NIZKP) may be used such that the user B 121 may prove that they have knowledge of (T) and/or (r) without disclosing (T) and/or (r). Stated mathematically, the user B 121 may generate ($\pi_p$) of (T), (r) such that $h_\ell$=Hash(T||r) and $P_i$(T) evaluates as true.

In some embodiments, the user B 121 may sample an updated randomness value ($r_0$) and evaluate an updated hash value ($h_0$) based on the token (T) and the updated randomness value ($r_0$). For example, ($h_0$) may be determined mathematically: $h_0$=Hash(T||$r_0$). In some embodiments, the one or more knowledge-proving credentials may include the updated hash value ($h_0$). The user B 121 may additionally generate a second proof of knowledge ($\pi_0$) to be included in the knowledge-proving credentials, where the second proof of knowledge may represent knowledge of the last hash value ($h_\ell$) and the updated hash value ($h_0$). For example, ($\pi_0$) may represent provable knowledge of the user B 121 of (r), ($r_0$), and (T) and such that $h_\ell$=Hash(T||r) and $h_0$=Hash (T||$r_0$). The user B 121 may additionally generate a first signed indication ($\sigma_{\pi_0}$) associated with the second proof of knowledge ($\pi_0$). For example, mathematically deriving the first signed indication may include the evaluation of $\sigma_{\pi_0}$=Sign($sk_j$,s||$\pi_0$) where ($\sigma_{\pi_0}$) may be the signed value associated with the second proof, Sign may be an encrypting/signing function in which a value is signed/encrypted using a signature key, ($sk_j$) may represent the signature key of the user B 121, (s) may represent a hash of the last block in the blockchain 130 associated with the token, and ($\pi_0$) may represent the second proof of knowledge. The user B 121 may additionally compute a second signed indication ($\sigma_{T_0}$) associated with the first public key ($pk_i$) associated with the user A 120. For example, the second signed indication ($\sigma_{T_0}$) may be represented mathematically as $\sigma_{T_0}$=Sign($sk_j$,$h_\ell$ ||$pk_i$) where ($\sigma_{T_0}$) may be the signed value associated with the first public key and ($sk_i$) may represent the signature key of the user B 121.

In some embodiments, the user B 121 may compute the encryption (c) of the token (T). For example, mathematically deriving the encryption (c) of the token (T) may include the evaluation of c=Enc($pk_i$,T||$r_0$), where (c) may be the encrypted value associated with the token (T), Enc may be an encrypting function in which a value is encrypted using a public key (such as ($pk_i$)), ($pk_i$) may represent the first public key of the user A 120, and ($r_0$) may represent the updated randomness value. The encryption (c) may secure the token (T) such that the contents of the token (T) and/or the updated randomness value may only be accessed with a private key associated with the public key. The user B 121 may additionally compute a third proof of knowledge ($\pi_{enc}$), the third proof of knowledge may include proof of knowledge that (c) is a valid encryption of some (T||$r_0$) satisfying $h_0$=Hash(T||$r_0$) under the public key ($pk_i$) where ($h_0$) represents the updated hash value and ($r_0$) represents the updated randomness value.

In some embodiments, the escrow 110 may obtain the one or more knowledge-proving credentials from the user B 121. For example, the knowledge-proving credentials may include one or more of the last hash value ($h_\ell$) in the first blockchain 130, the updated hash value ($h_0$), the first proof of knowledge ($\pi_p$), the second proof knowledge ($\pi_0$), the encryption of the token (c), the third proof of knowledge ($\pi_{enc}$), the first signed indication ($\sigma_{\pi_0}$), and/or the second signed indication ($\sigma_{T_0}$).

In some embodiments, the escrow 110 may verify the one or more knowledge-proving credentials obtained from the user B 121. For example, after receiving the knowledge-proving credentials, the escrow 120 may verify the credentials to validate that the user B 121 is the current owner of the token and/or possesses the knowledge utilized to convey ownership of the toke (T). For example, the escrow 120 may verify the first proof of knowledge ($\pi_p$), the second proof of knowledge ($\pi_0$), the third proof of knowledge ($\pi_{enc}$), the first signed indication ($\sigma_{\pi_0}$), and/or the second signed indication ($\sigma_{T_0}$).

After verifying that the user B 121 is the current owner of the token, the escrow 110 may request that the user A 120 send assets corresponding to the purchase price as identified in the tuple previously submitted by the user A 120. For example, the escrow 110 may obtain an amount of cryptocurrency corresponding to the first purchase price ($s_i$) from the user A 120, such as a certain amount of BITCOIN®, ETHERIUM®, TETHER®, others, or combinations thereof. In some embodiments, the escrow 110 may verify the cryptocurrency transfer. For example, the escrow 110 may verify the transfer of an amount of cryptocurrency associated with the first purchase price ($s_i$) from the user A 120 to the escrow 110 as an entry on the second blockchain 140.

In response to successfully verifying the transfer of the asset, the escrow 110 may initiate a transfer of the token (T) from the user B 121 to the user A 120. For example, the escrow 110 may send information to be posted to the first blockchain 130 that reflects the update in ownership of the token (T). In some embodiments, the information sent from the escrow 110 to the first blockchain 130 may include at least the updated hash value ($h_0$). For example, the escrow 110 may send the last hash value ($h_\ell$), the updated hash value ($h_0$), the first proof of knowledge ($\pi_p$), the first signed value ($\sigma_{\pi_0}$), and/or the second signed value ($\sigma_{\pi_0}$) to the first blockchain 130. The first blockchain 130 may post the updated hash value ($h_0$) to the first blockchain 130 to reflect the update in the ownership of the token (T). The escrow 110 may verify that the updated hash value ($h_0$) is added to the first blockchain 130 after the last hash value ($h_\ell$) so that the updated hash value ($h_0$) is the last block in the blockchain 130 related to ownership of the token (T). For example, Hash(T||$r_0$), representing ($h_0$) may be added after the last hash value ($h_\ell$) at the end of the blockchain entries included in the first blockchain 130.

After successfully verifying that the updated hash value ($h_0$) has been posted to the first blockchain 130, the escrow 110 may finalize the transaction by providing the token (T) to the user A 120 and the asset to the user B 121. For example, the escrow 110 may provide the encryption (c) of the token (T) to the user A 120. The user A 120 may use its private key ($sk_i$) associated with the first public key, ($pk_i$), to decrypt the encryption of the token to obtain the full and unencrypted version of the token (T). Additionally or alternatively, the escrow 110 may transfer the asset corresponding to the first purchase price to the user B 121. For example, the escrow 110 may send the cryptocurrency from an escrow account of the escrow 110 to a cryptocurrency wallet of the user B 121. The escrow 110 may additionally transmit a transaction completion message to the user B 121.

A similar process may follow if the user C 122 seeks to purchase the token (T) now owned by the user A 120. For example, the escrow 110 may obtain a second token requirement predicate ($P_k$) identifying the toekn (T), a second purchase price ($s_k$), and a second public key ($pk_k$) from the user C 122. The second token requirement predicate (PR) may also serve to identify the token (T) such that $P_k$(T) resolves as true. The escrow 110 may publish a second tuple ($P_k$, $s_k$, $pk_k$) obtained from the user C 122 to be publicly available. The user A 120 may determine that it wishes to transfer the ownership of the token (T) in exchange for the second purchase price.

In some embodiments, the user A 120 may prove to the escrow 110 that the user A 120 is the current owner of the token (T) and may provide a second set of knowledge-proving credentials. In some embodiments, the user A 120 may compute the second set of knowledge-proving credentials based on its knowledge of the updated hash value ($h_0$), the updated randomness value ($r_0$), and the token (T). For example, the user A 120 may sample a second updated randomness value ($r_1$) and evaluate a second updated hash value ($h_1$) of the token (T) and the second randomness value ($r_1$). The user A 120 may additionally generate a fourth proof of knowledge ($\pi_p$') of the updated randomness value ($r_0$) and the token (T) such that $h_0$=Hash(T||$T_0$) and $P_k$(T) is true.

In some embodiments, the user A 120 may additionally compute a fifth proof of knowledge ($\pi_1$), a third signed indication ($\sigma_{\pi_1}$), and a fourth signed indication ($\sigma_{T_1}$). For example, stated mathematically, the user A 120 may compute the fifth proof of knowledge ($\pi_1$) of ($r_0$), ($r_1$), and (T) such that $h_0$=Hash(T||$r_0$) and $h_1$=Hash(T|$r_1$), and may evaluate $\sigma_{\pi_1}$=Sign ($sk_i$,s||$\pi_1$) and $\sigma_{T_1}$=Sign($sk_i$,$h_0$||$pk_k$), where ($sk_i$) is the secret key of the user A 120 and ($pk_k$) is the second public key that is associated with the user C 122. The user A 120 may additionally compute a second encryption ($c_0$) of the token (T), and a sixth proof of knowledge ($\pi_{enc}$'). For example, state mathematically, the user A 120 may evaluate $c_0$=Enc($pk_k$,T||$r_1$), and may evaluate the sixth proof, ($\pi_{enc}$'), that ($c_0$) is a valid encryption of some (T||$r_1$) satisfying $h_1$=Hash(T||$r_1$) using the second public key ($pk_k$) associated with the user C 122.

In some embodiments, the escrow 110 may obtain, from the user A 120, the second set of knowledge-proving credentials, and verify the current ownership of the token (T). For example, the escrow 110 may obtain ($h_0$,$h_1$,$\pi_p$',$\pi_1$,$c_0$, $\pi_{enc}$',$\sigma_{\pi_1}$,$\sigma_{T_1}$) from the user A 120 and verify ($\pi_p$',$\pi_1$,$\pi_{enc}$', $\sigma_{\pi_1}$,$\sigma_{T_1}$). In response to verifying ownership of the token based on the second set of knowledge-proving credentials, the escrow 110 may obtain, from the user C 122, an asset corresponding to the second purchase price. The escrow 110 may send all or a portion of the second set of knowledge-proving credentials to be posted to the first blockchain 130 to show the transfer of ownership. For example, the escrow 110 may send the updated hash value ($h_0$), the second updated hash value ($h_1$), the fifth proof of knowledge ($\pi_1$), the third signed value ($\sigma_{\pi_1}$) and the fourth signed value ($\sigma_{T_1}$) to the first blockchain 130. The escrow 110 may verify that the second updated hash value ($h_1$) is posted to the first blockchain 130. For example, the escrow 110 may verify that the second updated hash value is added after the third blockchain entry 135*c*.

In some embodiments, the escrow 110 may observer or identify that the second updated hash value failed to post to the first blockchain 130. In these embodiments, the escrow 110 may cancel the transaction between the user A 120 and the user C 122. For example, the escrow 110 may return the asset received from the user C 122 to the user C 122. The escrow 110 may further transmit a transaction failure notice to the user A 120. The escrow 110 may also discard the second encryption and the second set of knowledge-proving credentials obtained from the user A 120.

Modifications, additions, or omissions may be made to the system 100 without departing from the scope of the disclosure. For example, the designations of different elements in the manner described is meant to help explain concepts described herein and is not limiting. As another example, the system 100 may include any number of other elements or may be implemented within other systems or contexts than those described. For example, the system 100 may include any number of users between which the token may be passed. As another example, there may be any number of administrators providing input to, and/or controlling the first blockchain 130. As a further example, there may be any number of blockchains, such as a first blockchain representing ownership of one token, a second blockchain representing ownership of another token, a third blockchain representing transactions of one type of cryptocurrency, and a fourth blockchain representing transactions of another type of cryptocurrency.

Figure 2A:
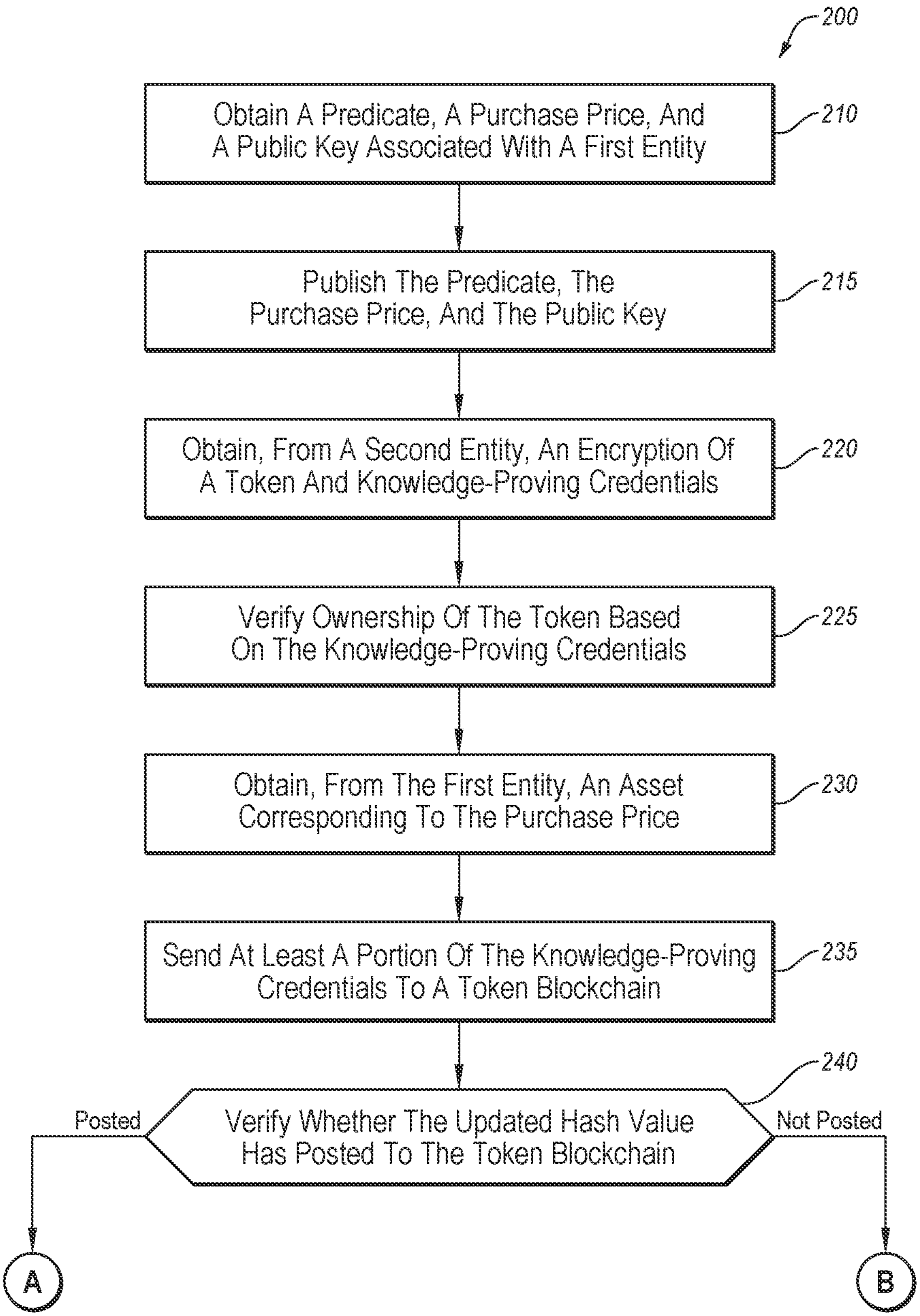
FIGS. 2A-2C illustrate an example flowchart of an example method of performing a transaction in a blockchain-based escrow marketplace.
Figure 2B:
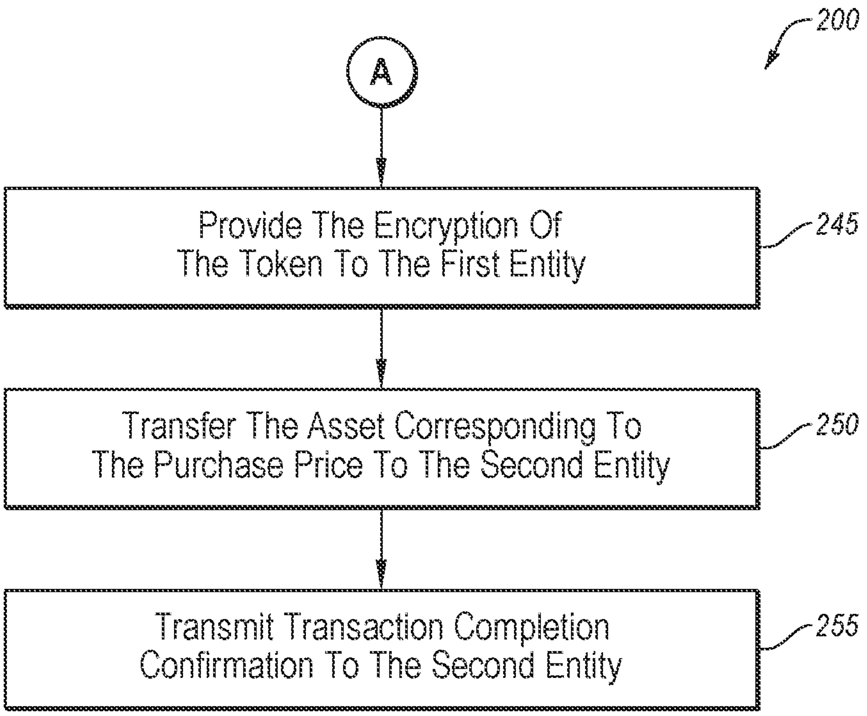
Figure 2C:
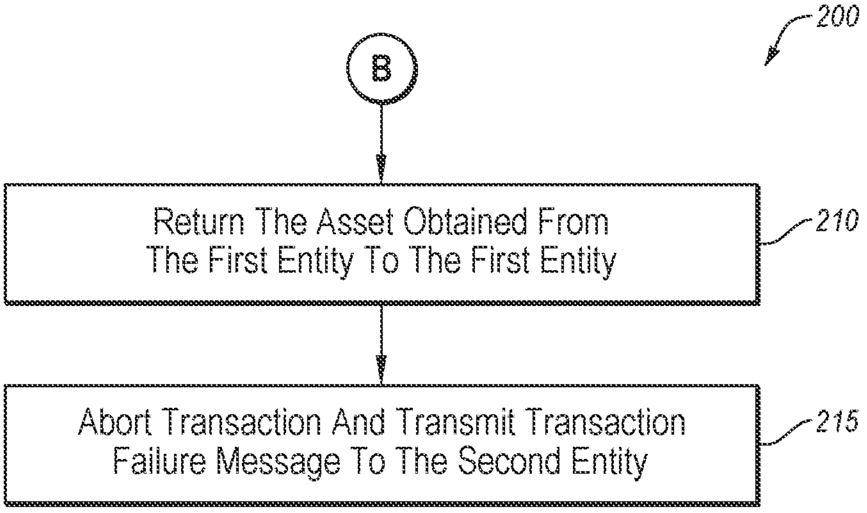

FIGS. 2A-2C illustrate an example flowchart of an example method 200 of performing a transaction in a blockchain-based escrow marketplace, in accordance with one or more embodiments of the present disclosure. One or more operations of the method 200 may be performed by a system or a device, or combinations thereof, such as the system 100, the escrow 110, the user A 120, the user B 121, the user C 122, the first blockchain 130, and/or the second blockchain 140. Although illustrated as discrete blocks, various blocks of the method 200 may be divided into additional blocks, combined into fewer blocks, or eliminated, depending on the implementation.

At block 210, a predicate, a purchase price, and a public key associated with a first entity may be obtained. For example, an escrow may receive the predicate ($P_i$), the purchase price ($s_i$), and the public key ($pk_i$) from a first entity who is seeking to purchase a specific token (T) and/or an asset for which the token (T) designates ownership. The predicate ($P_i$) may include identifiers or other properties of the token (T) such that an owner or holder of the token (T) may identify the token (T) based on the predicate ($P_i$). The purchase price ($s_i$) may identify an amount of a given asset, such as a US dollar amount, an amount of cryptocurrency, etc., that the first entity is willing to pay for the token (T). The public key ($pk_i$) may be a public key associated with the first entity. The public key ($pk_i$) may be part of a public/private key pair ($pk_i$, $sk_i$) where the public key ($pk_i$) may be used when encrypting information such that only the holder of the corresponding secret key ($sk_i$) is able to decrypt the information.

At block 215, the escrow may publish the predicate ($P_i$), the purchase price ($s_i$), and the public key ($pk_i$) as a tuple to be available to the public. For example, the escrow may publish ($P_i$, $s_i$, $pk_i$) to the public while not identifying the first entity. Such a posting may occur via a website, a message board, a blockchain, or any other publicly accessible electronic location.

At block 220, an encryption of the token and knowledge-proving credentials may be obtained. For example, a second entity may analyze the published tuple ($P_i$, $s_i$, $pk_i$) and determine that the second entity has the token (T) for which the first entity is looking. The second entity may compute the encryption of the token (T) using the public key of the first entity and generate the knowledge-proving credentials to prove the ownership of the token (T). The encryption and the knowledge-proving credentials may be provided to the escrow.

In some embodiments, the knowledge-proving credentials may include one or more of a last hash value (e.g., the most recently posted hash value in a blockchain showing that the second entity is the owner), an updated hash value (e.g., the hash value indicating the new ownership after transfer from the second entity to the first entity), a first proof of knowledge, the encryption of the token, a second proof of knowledge, a third proof of knowledge, a first signed indication, and/or a second signed indication.

At block 225, the ownership of the token may be verified based on the knowledge-proving credentials. For example, the escrow may verify that the second entity is the current owner of the token and/or possesses the knowledge utilized to convey ownership of the token (T) by verifying that the knowledge-proving credentials in fact describe sufficient knowledge of the token (T).

At block 230, an asset corresponding to the purchase price may be obtained from the first entity. For example, the escrow may obtain an amount of cryptocurrency corresponding to the purchase price ($s_i$) from the first entity such as a certain amount of BITCOIN®, ETHERIUM®, TETHER®, others, or combinations thereof. In some embodiments, the escrow may verify the transfer of the cryptocurrency using a blockchain associated with the cryptocurrency. Additionally or alternatively, the escrow may verify that the purchase price has appeared in a digital wallet or other account of the escrow.

At block 235, the escrow may send at least a portion of the knowledge-proving credentials to token blockchain. For example, the escrow may send at least the updated hash value ($h_0$) to the blockchain and initiate a token transfer. The ownership of the token may be transferred by posting the updated hash value ($h_0$) to the token blockchain.

At block 240, the escrow may verify whether or not the updated hash value posted to the blockchain. For example, the escrow may verify that the updated hash value is added to the token blockchain after the last hash value ($h_\ell$) so that the updated hash value ($h_0$) is the block most recently posted to the token blockchain, reflecting the change in ownership. As another example, the escrow may determine that the updated hash value ($h_0$) was not correctly posted to the token blockchain. For example, the escrow may find that the updated hash value ($h_0$) is not posted after the last hash value ($h_\ell$). For instance, the failure may be due to the second entity's lack of knowledge of the token (T), a computation error, an insufficient number of actors to validate the block containing the updated hash value ($h_0$), or any other cause. If the updated hash value has posted to the blockchain, the method 200 may proceed to the block 245 of FIG. 2B. If the updated hash value has not posted to the blockchain, the method 200 may proceed to the block 260 of FIG. 2C.

At block 245, based on the updated hash value ($h_0$) posting to the blockchain, the escrow may provide the encryption of the token to the first entity. For example, the escrow may provide the encryption (e.g., $c=\text{Enc}(pk_i, T|r_0)$ as explained in the present disclosure) of the token (T) generated by the second entity using the public key of the first entity. For instance, the first entity may decrypt the encryption of the token to obtain a full and unencrypted version of the token (T).

At block 250, the escrow may transfer the asset corresponding to the purchase price to the second entity. For example, the escrow may transfer the amount of cryptocurrency received from the first entity to the second entity.

At block 255, the escrow may transmit a transaction completion confirmation to the second entity. For example, after sending the encryption of the token (T) to the first entity and the cryptocurrency to the second entity, the escrow may notify the first entity and the second entity that the transaction is completed.

At block 260, based on the updated hash value ($h_0$) not posting to the blockchain, the escrow may return the asset obtained from the first entity back to the first entity. For example, the escrow may be temporarily holding the cryptocurrency received from the first entity in a digital wallet. The escrow may send back the same amount of cryptocurrency received from the first entity because the transfer of ownership via the blockchain failed. In some embodiments, the escrow may also transmit a transaction failure message to the first entity.

At block 265, the escrow may abort the transaction and transmit a transaction failure message to the second entity. For example, the escrow may discard the encryption and the knowledge-proving credentials obtained from the second entity and notify the second entity. In some embodiments, the failure notification may describe the reason for the failure.

Modifications, additions, or omissions may be made to the method 200 without departing from the scope of the disclosure. For example, the operations of the method 200 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 3:
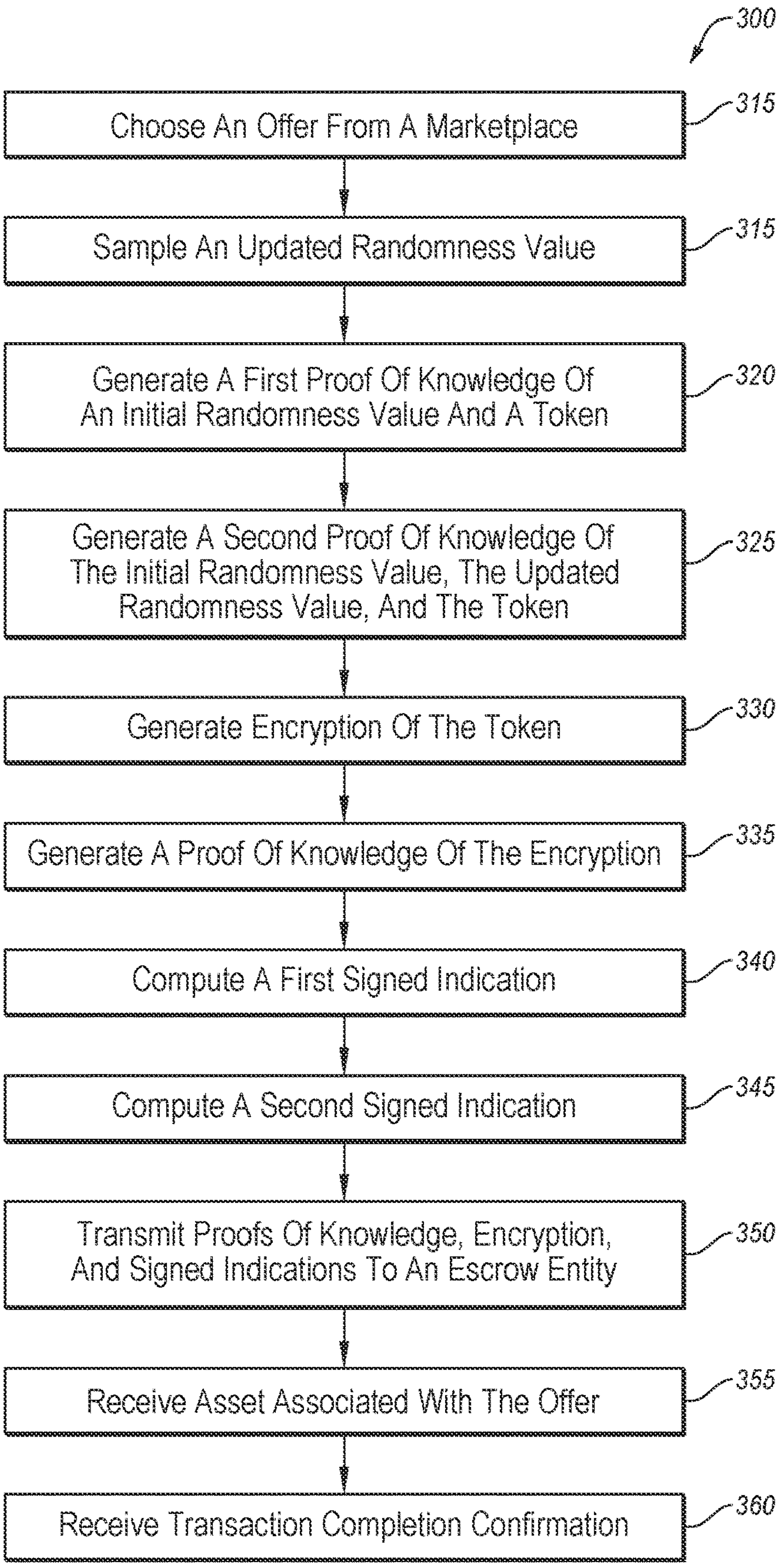
FIG. 3 illustrates an example flowchart of an example method of selling a token through an escrow.

FIG. 3 illustrates an example flowchart of an example method 300 of selling a token through an escrow, in accordance with one or more embodiments of the present disclosure. For example, the method 300 may be an example of or an expansion of the blocks 220, 250 and/or 255 from FIGS. 2A and 2B. One or more operations of the method 300 may be performed by a system or device, or combinations thereof, such as the system 100, the escrow 110, the user A 120, the user B 121, the user C 122, the first blockchain 130, and/or the second blockchain 140. Although illustrated as discrete blocks, various blocks of the method 300 may be divided into additional blocks, combined into fewer blocks, or eliminated, depending on the implementation.

At block 310, a second entity may choose an offer from a marketplace. For example, an escrow may publish an offer received from a first entity to the marketplace. For example, the escrow may publish or otherwise make available to the public a tuple of a predicate, a purchase price, and a public key ($P_i$, $s_i$, $pk_i$) as the information from the first entity indicative of their interest in the token (T). The second entity may choose the tuple with the predicate ($P_i$) associated with the token (T) held by the second entity and with the offer ($s_i$) with which the second entity agrees.

At block 315, the second entity may sample an updated randomness value. For example, the second entity may sample a new random value as the updated randomness value ($r_0$) from the set of all real numbers to be associated with the token (T) and a new owner.

At block 320, the second entity may generate a first proof of knowledge of an initial randomness value and the token. For example, the first proof of knowledge ($\pi_p$) may indicate knowledge of the token (T) and an initial randomness value (r) associated with ownership of the token (T). For example, an NIZKP may be used such that the second entity may prove that they have knowledge of (T) and (r) without disclosing (T) and/or (r).

At block 325, the second entity may generate a second proof of knowledge of the initial randomness value, the updated randomness value, and the token. For example, the second proof of knowledge ($\pi_0$) may indicate knowledge of the last hash value ($h_\ell$) and the update hash value ($h_0$). For example, the second proof of knowledge may be an NIZKP that represents a provable knowledge of the second entity of the initial randomness value (r), the updated randomness value ($r_0$), and the token (T) and such that $h_\ell=\text{Hash}(T\|r)$ and $h_0=\text{Hash}(T\|r_0)$.

At block 330, the second entity may generate an encryption of the token. For example, the second entity may encrypt the token using the public key ($pk_i$). The encryption (c) may secure the token (T) such that the contents of the token (T) and/or the updated randomness value may only be accessed with a private key associated with the public key of the first entity. Stated another way, an escrow or other intermediary would be unable to observe the contents of the token (T) without the private key.

At block 335, a third proof of knowledge of the encryption (c) may be generated. For example, the second entity may generate the third proof of knowledge which may include proof of knowledge that (c) is a valid encryption of some ($T \| r_0$) satisfying $h_0 = \text{Hash}(T \| r_0)$ under the public key ($pk_i$).

At block 340, a first signed indication may be computed. For example, the second entity may compute the first signed indication associated with the second proof of knowledge (e.g., $\sigma_{\pi_0} = \text{Sign}(sk_j, s \| \pi_0)$ as explained in the present disclosure.)

At block 345, a second signed indication may be computed. For example, the second entity may compute the signed indication associated with the public key associated with the first entity (e.g., $\sigma_{T_0} = \text{Sign}(sk_j, h_\ell \| pk_i)$ as explained in the present disclosure).

At block 350, the second entity may transmit proofs of knowledge, the encryption, and/or the signed indications to the escrow. For example, the second entity may transmit one or more of the first proof of knowledge, the second proof of knowledge, the encryption, the third proof of knowledge, the first signed indication, and/or the second signed indication to prove its ownership of the token (T). In some embodiments, the second entity may also transmit the last hash value ($h_\ell$) and the updated hash value ($h_0$).

At block 355, the second entity may receive an asset associated with the offer. For example, the second entity may receive cryptocurrency corresponding to a purchase price ($s_i$) posted on the marketplace as part of the offer of the first entity from the escrow.

At block 360, the second entity may receive a transaction completion confirmation. For example, the escrow may indicate to the second entity that the escrow has successfully transferred the encryption of the token to the first entity and that the transfer of the cryptocurrency to the second entity is completed.

Modifications, additions, or omissions may be made to the method 300 without departing from the scope of the disclosure. For example, the operations of the method 300 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 4:
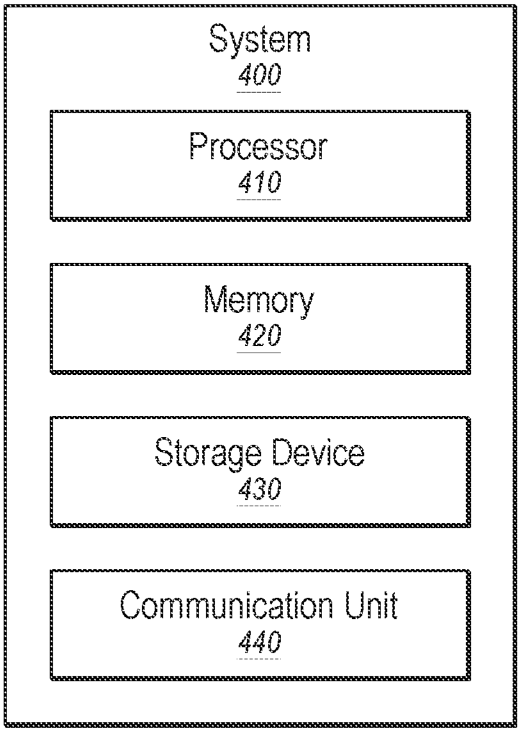
FIG. 4 illustrates an example computing system.

FIG. 4 illustrates an example computing system 400, according to at least one embodiment described in the present disclosure. The computing system 400 may include a processor 410, a memory 420, a storage device 430, and/or a communication unit 440, which all may be communicatively coupled. Any or all of the system 100 of FIG. 1 may be implemented as a computing system consistent with the computing system 400, such as the escrow 110, the user A 120, the user B 121, the user C 122, the first blockchain 130, and/or the second blockchain 140 of FIG. 1. For example, the user A 120 may perform operations using an electronic device consistent with the computing system 400. As another example, the first blockchain 130 may be stored and/or verified across multiple instantiations of a computer consistent with the computing system 400.

Generally, the processor 410 may include any computer, computing entity, or processing device including various computer hardware or software modules and may be configured to execute instructions stored on any applicable computer-readable storage media. For example, the processor 410 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 4, it is understood that the processor 410 may include any number of processors distributed across any number of network or physical locations that are configured to perform individually or collectively any number of operations described in the present disclosure. In some embodiments, the processor 410 may interpret and/or execute program instructions and/or process data stored in the memory 420. In some embodiments, the processor 410 may load the program instructions into the memory 420.

After the program instructions are loaded into the memory 420, the processor 410 may execute the program instructions, such as instructions to perform any of the methods 200 and/or 300 of FIGS. 2A-3, respectively. For example, the processor 410 may obtain instructions regarding facilitating a transaction between users, verifying ownership of a token, posting information to a blockchain, etc.

The memory 420 and the storage device 430 may include computer-readable storage media or one or more computer-readable storage mediums for carrying or having computer-executable instructions or data structures stored thereon. Such computer-readable storage media may be any available media that may be accessed by a computer, such as the processor 410. For example, the memory 420 and/or the storage device 430 may store a complete copy of a blockchain (such as the first blockchain 130 of FIG. 1). In some embodiments, the computing system 400 may or may not include either of the memory 420 and/or the storage device 430.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures. Combinations of the above may also be included within the scope of computer-readable storage media. Computer-executable instructions may include, for example, instructions and data configured to cause the processor 410 to perform a certain operation or group of operations.

The communication unit 440 may include any component, device, system, or combination thereof that is configured to transmit or receive information over a network. In some embodiments, the communication unit 440 may communicate with other devices at other locations, the same location, or even other components within the same system. For example, the communication unit 440 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 440 may permit data to be exchanged with a network and/or any other devices or systems described in the present disclosure. For example, the communication unit 440 may allow the system 400 to communicate with other systems, such as computing devices and/or other networks.

One skilled in the art, after reviewing this disclosure, may recognize that modifications, additions, or omissions may be made to the system 400 without departing from the scope of the present disclosure. For example, the system 400 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc. are not necessarily used herein to connote a specific order. Generally, the terms "first," "second," "third," etc., are used to distinguish between different elements. Absence a showing of a specific that the terms "first," "second," "third," etc. connote a specific order, these terms should not be understood to connote a specific order.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that various changes, substitutions, and alterations could be made hereto without departing from the spirit and scope of the present disclosure.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method comprising:

obtaining, from a first entity, a predicate, a first purchase price, and a first public key associated with the first entity, the predicate used by the first entity to identity a token without revealing contents of the token;

publishing the predicate, the first purchase price, and the first public key;

obtaining, from a second entity, an encryption of the token and one or more knowledge-proving credentials of the token, the token satisfying the predicate, and the encryption of the token encrypted using the first public key;

verifying ownership of the token based on the knowledge-proving credentials without access to the contents of the token;

obtaining, from the first entity, an asset corresponding to the first purchase price;

sending at least a portion of the knowledge-proving credentials to a token blockchain, the portion of the knowledge-proving credentials including an updated hash value, the updated hash value representing ownership of the token being transferred from the second entity to the first entity;

verifying that the updated hash value is posted to the token blockchain;

providing the encryption of the token to the first entity; and transferring the asset corresponding to the first purchase price to the second entity.

2. The method of claim 1, wherein the knowledge-proving credentials include a last hash value in the token blockchain, the last hash value representative of a current owner of the token, the updated hash value, a first proof of knowledge, a second proof of knowledge, a third proof of knowledge, a first signed indication, and a second signed indication.

3. The method of claim 2, wherein:

the first proof of knowledge includes a knowledge of an initial randomness value and the token, and the last hash value of the token includes a first hash value of a first concatenation of the token and the initial randomness value.

4. The method of claim 2, wherein:

the second proof of knowledge includes a knowledge of an initial randomness value, an updated randomness value, and the token, the last hash of the token includes a first hash value of a first concatenation of the token and the initial randomness value, and the updated hash value includes a second hash value of a second concatenation of the token and the updated randomness value.

5. The method of claim 2, wherein:

the third proof of knowledge includes a knowledge of the encryption of the token, the encryption of the token includes an encryption using the first public key of a second concatenation of the token and an updated randomness value such that a second hash value of the second concatenation of the token and the updated randomness value satisfies the updated hash value.

6. The method of claim 2, wherein the first signed indication includes a third concatenation of a hash of a latest block in the token blockchain and the second proof of knowledge, the first signed indication signed with a signature key of the second entity.

7. The method of claim 2, wherein the second signed indication includes a fourth concatenation of the last hash value and the first public key associated with the first entity, the second singed indication signed with a signature key of the second entity.

8. The method of claim 1, wherein the encryption of the token comprises an encryption of a concatenation of the token and an updated randomness value as newly-sampled by the second entity.

9. The method of claim 1, further comprising verifying the asset corresponding to the first purchase price at least by reference to a blockchain associated with the asset.

10. The method of claim 1, wherein the portion of the knowledge-proving credentials sent to the token blockchain further includes a last hash value in the token blockchain corresponding to the token, the updated hash value, a second proof of knowledge, a first signed indication, and a second signed indication.

11. The method of claim 1, wherein the method is performed by an escrow entity and contents of the token remains unknown by the escrow entity, an identity of the first entity remains unknown by the second entity, and an identity of the second entity remains unknown by the first entity.

12. The method of claim 1, further comprising:

obtaining a second predicate, a second purchase price, and a second public key from a third entity;

obtaining from the first entity, a second encryption of the token, and a second set of knowledge-proving credentials, the second encryption made with the second public key;

verifying the second encryption of the token based on the second set of knowledge-proving credentials;

obtaining a second asset corresponding to the second purchase price from the third entity;

sending a portion of the second set of knowledge-proving credentials to the token blockchain, the portion including at least a second updated hash value determined by the first entity; and in response to failing to confirm the second updated hash value is added to the token blockchain, returning the obtained second asset to the third entity.

13. The method of claim 1, wherein the asset includes cryptocurrency.

14. One or more non-transitory computer-readable media storing instructions that, when executed by one or more processors, cause a system to perform operations, the operations comprising:

obtaining, from a first entity, a predicate, a first purchase price, and a first public key associated with the first entity, the predicate used by the first entity to identity a token without revealing contents of the token;

publishing the predicate, the first purchase price, and the first public key;

obtaining, from a second entity, an encryption of the token and one or more knowledge-proving credentials of the token, the token satisfying the predicate, and the encryption of the token encrypted using the first public key;

verifying ownership of the token based on the knowledge-proving credentials without access to the contents of the token;

obtaining, from the first entity, an asset corresponding to the first purchase price;

sending at least a portion of the knowledge-proving credentials to a token blockchain, the portion of the knowledge-proving credentials including an updated hash value, the updated hash value representing ownership of the token being transferred from the second entity to the first entity;

verifying that the updated hash value is posted to the token blockchain;

providing the encryption of the token to the first entity; and transferring the asset corresponding to the first purchase price to the second entity.

15. The one or more non-transitory computer-readable media of claim 14, wherein the knowledge-proving credentials include a last hash value in the token blockchain, the last hash value representative of a current owner of the token, the updated hash value, a first proof of knowledge, a second proof of knowledge, a third proof of knowledge, a first signed indication, and a second signed indication.

16. The one or more non-transitory computer-readable media of claim 15, wherein:

the first proof of knowledge includes a knowledge of an initial randomness value and the token, and the last hash of the token satisfies a hash value of concatenation of the token and the initial randomness value.

17. The one or more non-transitory computer-readable media of claim 15, wherein:

the second proof of knowledge includes a knowledge of an initial randomness value, an updated randomness value, and the token, the last hash of the token includes a first hash value of a first concatenation of the token and the initial randomness value, and the updated hash value includes a second hash value of a second concatenation of the token and the updated randomness value.

18. The one or more non-transitory computer-readable media of claim 15, wherein:

the third proof of knowledge includes a knowledge of the encryption of the token, the encryption of the token includes an encryption using the second public key of a second concatenation of the token and an updated randomness value such that a second hash value of the second concatenation of the token and the updated randomness value satisfies the updated hash value.

19. The one or more non-transitory computer-readable media of claim 15, wherein the first signed indication includes a third concatenation of a hash of a latest block in the token blockchain and the second proof of knowledge, the first signed indication signed with a signature key of the second entity.

20. The one or more non-transitory computer-readable media of claim 15, wherein the second signed indication includes a fourth concatenation of the last hash value and the first public key associated with the first entity, the second singed indication signed with a signature key of the second entity.

* * * * *